US009176542B2

(12) United States Patent
Milne et al.

(10) Patent No.: US 9,176,542 B2
(45) Date of Patent: Nov. 3, 2015

(54) ACCELEROMETER-BASED TOUCHSCREEN USER INTERFACE

(75) Inventors: James R. Milne, Ramona, CA (US); Kirstin Connors, San Diego, CA (US); Trisha Ann Sachie Yasuhara, San Diego, CA (US)

(73) Assignee: Sony Corporation, Tokyo (JP)

( * ) Notice: Subject to any disclaimer, the term of this patent is extended or adjusted under 35 U.S.C. 154(b) by 1400 days.

(21) Appl. No.: 12/698,507

(22) Filed: Feb. 2, 2010

(65) Prior Publication Data

US 2011/0109546 A1 May 12, 2011

Related U.S. Application Data

(60) Provisional application No. 61/258,731, filed on Nov. 6, 2009.

(51) Int. Cl.
*G06F 3/033* (2013.01)
*G06F 1/16* (2006.01)
*H04W 16/18* (2009.01)

(52) U.S. Cl.
CPC ............. *G06F 1/1694* (2013.01); *H04W 16/18* (2013.01)

(58) Field of Classification Search
CPC .............................. G06F 1/1694; H04W 16/18
USPC ........................................................ 345/158
See application file for complete search history.

(56) References Cited

U.S. PATENT DOCUMENTS

| 6,861,946 | B2 * | 3/2005 | Verplaetse et al. ......... 340/407.2 |
| 7,420,510 | B2 | 9/2008 | Kolavennu et al. |
| 2003/0001865 | A1 * | 1/2003 | Hirose et al. .................. 345/619 |
| 2004/0145613 | A1 | 7/2004 | Stavely et al. |
| 2005/0059406 | A1 | 3/2005 | Thomson et al. |
| 2007/0152984 | A1 | 7/2007 | Ording et al. |
| 2008/0048980 | A1 | 2/2008 | Love et al. |
| 2008/0143675 | A1 | 6/2008 | Hsieh et al. |
| 2008/0182584 | A1 | 7/2008 | Le |

(Continued)

FOREIGN PATENT DOCUMENTS

| EP | 1062994 | 12/2001 |
| WO | 2009102713 | 8/2009 |

OTHER PUBLICATIONS

Hiroya Fujii, Isamu Arie, Ronald Clark, Justin Randolf Jakobson, Yuji Oikawa, Joe Wada, Rui Yamagami, Takuo Ikeda, Chia-Yao Lin, Junghee Yeo, "Digital Clock with Internet Connectivity and Multiple Resting Orientations", File History of co-pending U.S. Appl. No. 12/820,548, filed Jun. 22, 2010.

(Continued)

*Primary Examiner* — Towfiq Elahi
(74) *Attorney, Agent, or Firm* — John L. Rogitz

(57) ABSTRACT

A CE device for, e.g., displaying the time can incorporate an accelerometer to provide various features and enhancements. For example, tilting of the housing as sensed by the accelerometer may be used for controlling a volume output by an audio display, and/or for controlling a position of a screen cursor relative to underlying presentation on a visual display, and/or for controlling motion of a virtual object presented on the visual display; and/or for rotating a presentation on the visual display to always be oriented up and/or for determining that a person has tapped the housing based on signals from the accelerometer and in response thereto presenting an image of a rotatable object on the display.

8 Claims, 7 Drawing Sheets

(56) References Cited

U.S. PATENT DOCUMENTS

| | | | |
|---|---|---|---|
| 2008/0192021 A1* | 8/2008 | Lim et al. | 345/173 |
| 2008/0211775 A1* | 9/2008 | Hotelling et al. | 345/168 |
| 2008/0309624 A1 | 12/2008 | Hotelling | |
| 2009/0007006 A1* | 1/2009 | Liu et al. | 715/784 |
| 2009/0085878 A1 | 4/2009 | Heubel et al. | |
| 2009/0133499 A1 | 5/2009 | Cato | |
| 2009/0153466 A1* | 6/2009 | Tilley | 345/156 |
| 2009/0174680 A1 | 7/2009 | Anzures et al. | |
| 2009/0262074 A1* | 10/2009 | Nasiri et al. | 345/158 |
| 2010/0014691 A1* | 1/2010 | Moseley et al. | 381/107 |

OTHER PUBLICATIONS

James R. Milne, Kirstin Connors, Trisha Ann Sachie Yasuhara, "Accelerometer-Based CE Device Wireless Access Point Mapping", File History of co-pending U.S. Appl. No. 12/705,173, filed Feb. 12, 2010.

Paul Jin Hwang, Fredrik Carpio, Nikolaos Georgis, Benjamin Lo, "GPS-Based CE Device Wireless Access Point Mapping", File History of co-pending U.S. Appl. No. 12/715,525, filed Mar. 2, 2010.

Silver Pac, "Silver PAC Evolution 5500 Remote Would Have Been Great 3 Years Ago", Dec. 14, 2009; http://gizmodo.com/5426322/silver-pac-evolution-5500-remotoe-would-have-been-grat-3-years-ago.

The chumby one-a new faster, cheaper chumby, Nov. 16, 2009, http://krunker.com/2009/11/16/the-chumby-one-a-new-faster-cheaper-chumby/.

Radionow, "Intergrated DAB, wi-fi, Twitter and Facebook? It makes Pure Sensia", Sep. 21, 2009; http://www.radio-now.com.uk/pure-sensia-wifi-dab-fadio.htm.

Kristofer Brazio, "Sungale ID800WT 8 Inch Wi-Fi Digital Touchscreen Photo Frame", Jun. 30, 2009; http://www.testfreaks.com/blog/reviews/sungale-id800wt-8-inch-wi-fi-digital-touchscreen-photo-frame/.

A.R. Sandeep, Y.Shreyas, Shivam Seth, Rajat Agarwal, G. Sadashivappa; "Wireless Network Visualization and Indoor Empirical Propagation Model for a Campus Wi-Fi Network", http://www.waset.org/journals/wset/v42/v42-135.pdf, 2008.

Junfang Wang, Bin Xie, Kan Cai, Agrawal, D.P., "Efficient Mesh Router Placement in Wireless Mesh Networks", http://ieeexplore.ieee.org/xpl/freeabs_all.jsp?arnumber=4428616, 2007.

S.Kouhbor, Julien Ugon, Alex Kruger, Alex Rubinov of University of Ballarat; "Optimal Placement of Access Point in WLAN Based on a New Algorithm" http://www.computer.org/portal/web/csdl/dio/10-1109/CMB.2005.75, 2005.

Joern Loviscach, "Two-finger input with a standard touch screen", http://delivery.acm.org/10.1145/1300000/1294239/p169-loviscach.pdf?key1=569877062&coll-GUIDE&dl=GUIDE&CFID=68226013&CFTOKEN=27729349, pp. 169-172.

"Apple extending multi-touch to mice?" http://hrmpf.com/wordpress/131/apple-extending-multi-touch-to-mice, Jul. 5, 2007.

Filip Truta, "Engineer Invents 'iPod cube' with Accelerometer Player can sense inclination, tilt and shock", http://news.softpedia.com/news/Engineer-Invents-039-iPod-cube-039-with-Accelerometer-103244.shtml, Jan. 29, 2009.

Unofficial iPhone Blog, "What Does Built-In Sensors and Accelerometer in iPhone Are For?" http://www.vmfactor.com/iPhone/?tag=iphone-orientation, 2008.

Jacob Schulman, "iPhone/iTouch App of the Day: Labyrinth", http://macapper.com/2007/11/01/iphoneitouch-app-of-the-day-labyrinth/, Nov. 1, 2007.

Apple, "What do the proximity and orientation sensors in the iPhone do" http://www.iphonefaq.org/archives/9721, Jan. 19, 2007.

James R. Milne, Kirstin Connors, Trisha Ann Sachie Yasuhara, "Acceleroeter-Based Tapping User Interface", co-pending U.S. Appl. No. 12/705,106, filed Feb. 12, 2010.

* cited by examiner

ACCELEROMETER-BASED TOUCHSCREEN USER INTERFACE

This application claims priority from U.S. provisional application 61/258,731, filed Nov. 6, 2009.

I. FIELD OF THE INVENTION

The present application is directed to using an accelerometer in a consumer electronics (CE) device to provide enhanced functionality of the CE device.

II. BACKGROUND OF THE INVENTION

A wide variety of CE devices such as wireless telephones, digital clocks, etc. leverage digital processing to provide a multiplicity of useful features to users. The present application understands that such devices may be further enhanced by incorporating accelerometer principles.

As understood herein, compact technology known as microelectromechanical systems (MEMS) has been used to establish an accelerometer which, among other things, can measure acceleration above and below the gravitational constant. Essentially, an accelerometer measures acceleration in all three spatial dimensions (e.g., along all three linear Cartesian axes), and the acceleration of an object such as a CE device in space may be correlated to the object's orientation, motion, and to detect taps on the object.

For instance, present principles understand that once an initial orientation is established, acceleration signals may be used to determine if an object is changing its orientation. As also recognized herein, a tap on an object can be sensed using an accelerometer because another object colliding with the accelerometer-bearing object causes a deceleration, e.g., a tap came from the +Z direction relative to the accelerometer makes an impact in the −Z direction. There are several variations to the above properties including tilt, shake, and free fall, but essentially these variations fit into one or more of the three main properties.

SUMMARY OF THE INVENTION

A consumer electronics (CE) device includes a housing bearing a processor, a visual display, and an audio display. The processor controls the displays. An accelerometer is in the housing and outputs signals to the processor representing acceleration of the housing. The processor determines a tilt of the housing based on signals from the accelerometer and in response thereto controls a volume output by the audio display, and/or controls a position of a screen cursor relative to underlying presentation on the visual display, and/or controls motion of a virtual object presented on the visual display.

When using tilt to control the volume output by the audio display, the volume can be changed proportionate to a degree of tilt determined by the processor. When using tilt to control a position of a screen cursor relative to underlying presentation on the visual display, either the cursor may be moved on the visual display in a direction indicated by the tilt, or the cursor can remain fixed in a location of the visual display and the underlying presentation can be moved on the visual display in response to the tilt. The speed of motion of the cursor relative to the underlying presentation on the visual display can be proportional to a degree of tilt determined by the processor. Similarly, when tilt is used to control motion of a virtual object presented on the visual display, the speed of motion of the object on the visual display can be proportional to a degree of tilt determined by the processor.

In another aspect, a consumer electronics (CE) device includes a housing bearing a processor and a visual touchscreen display. The processor controls the display. An accelerometer is in the housing and outputs signals to the processor representing acceleration of the housing. The processor determines that a person has tapped the housing based on signals from the accelerometer and in response thereto presents an image of a rotatable object on the display. Subsequently, the processor detects arcuate motion of a person's finger over the rotatable object and in response thereto outputs a parameter-varying signal such as a volume-changing signal.

In another aspect, a method includes determining a tilt of a housing of a CE device based on signals from an accelerometer in the housing; and in response thereto controlling a volume output by an audio display. In addition or alternatively, the method can include controlling a position of a screen cursor relative to underlying presentation on a visual display, and/or controlling motion of a virtual object presented on the visual display. In yet another addition or alternative, the method may include rotating a presentation on the visual display to always be oriented up and/or determining that a person has tapped the housing based on signals from the accelerometer. In response to a tap the method includes presenting an image of a rotatable object on the display and detecting arcuate motion of a person's finger over the rotatable object. In response to arcuate finger motion the method includes outputting a parameter-varying signal.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
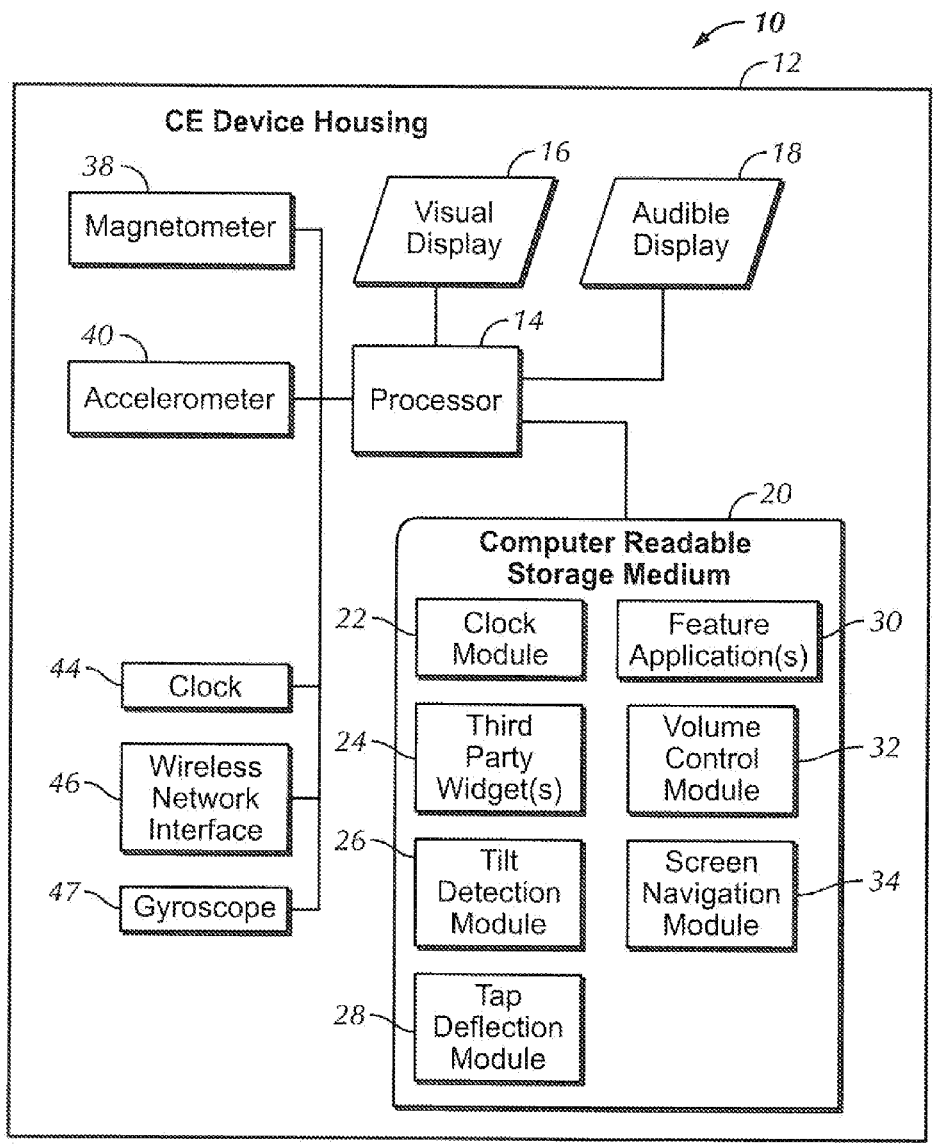
FIG. 1 is a block diagram of an example system in accordance with present principles.

Referring initially to FIG. 1, a CE device 10 is shown that includes a typically portable lightweight plastic housing 12 bearing a digital processor 14. The processor 14 can control a visual display 16 and an audible display 18 such as one or more speakers. The visual display 16 may be, e.g., a capacitive touchscreen display, although other display types may be used.

To undertake present principles, the processor 14 may access one or more computer readable storage media 20 such as but not limited to disk-based or solid state storage. In example non-limiting embodiments, the media 20 may store various software modules, including, for example, a clock module 22 for presenting a visual indication of time on the display 16, and one or more widgets 24 that may be provided by third parties and/or by the manufacturer of the CE device. By "widget" is meant a portable module of computer software, or application, that can be installed and executed within, for example, a HTML-based web page by an end user without requiring compilation. Widgets can take the form of on-screen tools (such as, e.g., clocks, event countdowns, auction-tickers, stock market tickers, flight arrival information, daily weather etc).

Additionally, the media 20 may store a tilt detection module 26 and a tap detection module 28. The tilt detection module 26 can be executed by the processor 14 to translate acceleration signals from the below-described accelerometer into an indication of tilting the CE device 10 about one or more spatial axes. Because the acceleration signals represent acceleration in each of the three dimensions of space, such translation to tilt is straightforward, essentially representing the combination of three acceleration vectors.

In contrast, the tap module 28 may be executed by the processor 14 to determine that a person has tapped the housing 12 by observing a spike (sudden increase followed by sudden decrease) in acceleration in at least one of the three dimensions.

The media 20 may also include one or more feature application(s) 30 such as an e-book application, a recipe application, a notes application in which, for instance, a user can input handwriting by moving a stylus over the display 16 which is then translated by image recognition software into alpha-numeric character code for storage, and a music/video player application, a grocery list application in which, for instance, a user can input grocery items by moving a stylus over the display 16 which is then translated by image recognition software into alpha-numeric character code for storage.

Additionally, the media 20 may bear a volume control module 32 and a screen navigation module 34.

The left portion of FIG. 1 shows that in addition to the processor 14, displays 16, 18, and media 20, the housing 12 may hold a magnetometer 38 which outputs a signal to the processor 14 representing magnetic north. Also, an accelerometer assembly 40 communicates acceleration signals to the processor 14 for purposes to be shortly disclosed. In one example, the accelerometer 40 is a MEMS-based accelerometer which outputs signals representing acceleration in each of the three spatial dimensions.

In one example, the accelerometer 40 is located near a corner of the housing 12, distanced from the geometric center of the housing, so that it can better sense tilting of the housing, which typically occurs about a central axis of the housing predominantly in two of the three dimensions, i.e., predominantly in the x and y dimensions, or the x and z dimensions, or the y and z dimensions. In determining tilt below, the processor 14 executing the tilt module 26 may receive three acceleration signals, one for each dimension, from the accelerometer 40 and select the two largest, combining the two largest to determine the direction and magnitude of tilt. This is because while tilting in two dimensions is intended, a person might also tilt the housing 12 somewhat in the third dimension. Or, in the event that the accelerometer includes an internal processing circuit that outputs to the processor 14 a single consolidated signal representing acceleration in three dimensional space, the processor 14 may filter out the smallest component in the three dimensional acceleration signal to determine tilt.

In some examples, a computer clock 44 may also be provided to output a time of day signal to the processor 14 for display of the time on the visual display 16 and for, e.g., the sounding of a time-based alarm on the audible display 18. If desired, a wireless network interface 46 may be in the housing 12 and may communicate with the processor 14 to permit the processor 14 to communicate with a wide area computer network such as the Internet. The interface 46 may be, without limitation, a Wi-Fi interface. A gyroscope 47 may be provided in the housing and may communicate orientation signals to the processor indicating the orientation of the housing. While the accelerometer signals can indicate tilt, signals from the gyroscope 47 can provide finer granularity of degree of tilt if desired.

Figure 2:
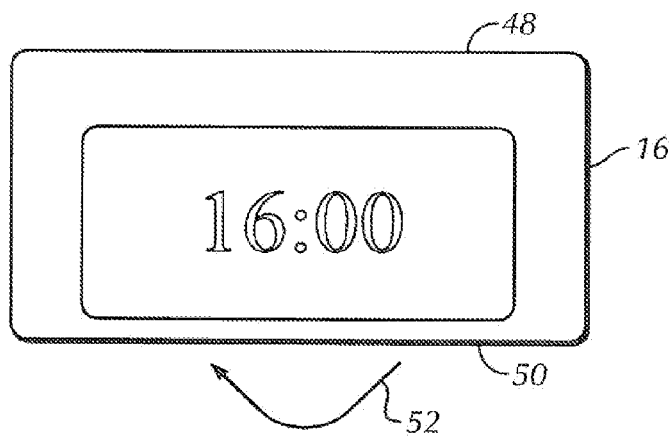
FIG. 2 is a screen shot of an example CE device in a first orientation showing a data display.
Figure 3:
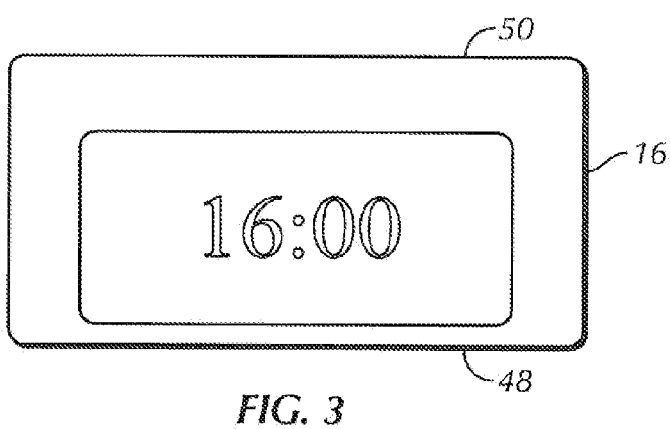
FIG. 3 is a screen shot of the CE device in FIG. 2 in a second orientation showing the data display.
Figure 4:
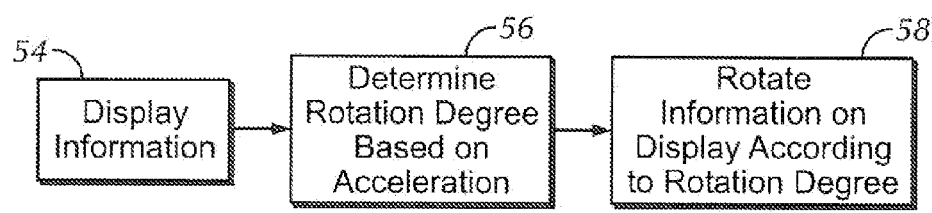
FIG. 4 is a flow chart of logic for rotating the data display in FIGS. 2 and 3.

Now referring to FIGS. 2-4, a readable presentation, in this example, the time of day, on the display 16 can be flipped as the CE device is turned so that the readable presentation always assumes a default orientation relative to the earth. For example, suppose the CE device is vended with the intention that the surface 48 is the top of the housing and the surface 50 the bottom, as illustrated in FIG. 2. But if the surfaces 48, 50 are similar and a person flips the housing over as indicated by the arrow 52 so that the bottom surface 50 is now on top (FIG. 3), present principles permit flipping the readable presentation as shown so that it continues to bear the default orientation with respect to the earth as shown.

Accordingly, at block 54 the readable information is presented on the display 16 in the default orientation, in this example, an orientation that assumes the housing is resting on the bottom surface 50. Moving to block 56, the processor 14 receives signals from the accelerometer 40 and, executing the tilt module 26, determines the number of degrees through which the CE device has been rotated based thereon. In the example shown, the CE device has been flipped 180 degrees, so at block 58 the processor rotates the readable information preferably by the same or approximately the same number of degrees the CE device has been flipped, e.g., 180 degrees. It is to be understood that present principles apply to, e.g., flipping the CE device 90 degrees from the assumed nominal orientation of FIG. 2.

Figure 5:
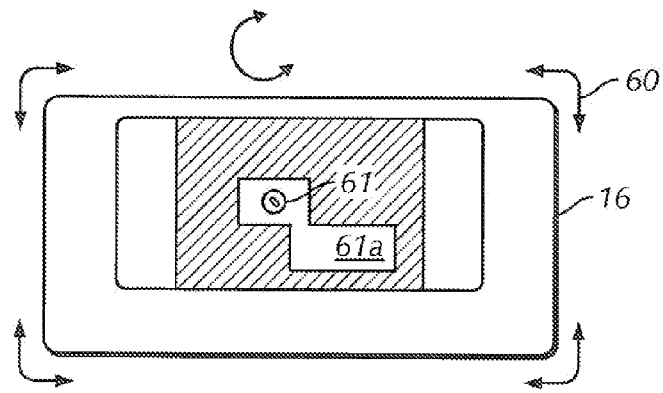
FIG. 5 is a screen shot of the CE device presenting a widget with a movable virtual object.
Figure 6:
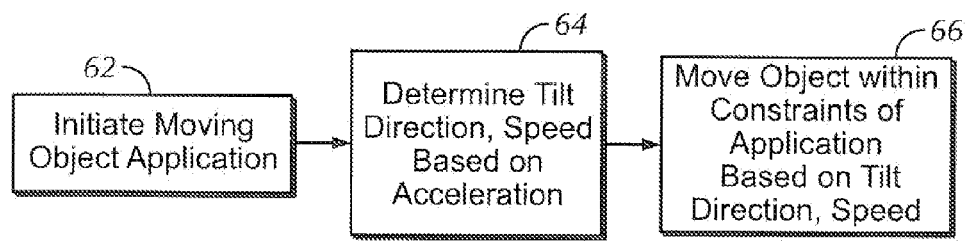
FIG. 6 is a flow chart showing the logic used to control the object in FIG. 5 based on tilt.

FIGS. 5 and 6 illustrate an example of how a tilting game (which may be implemented by a widget 24) can work using accelerometer 40-sensed tilt, in some cases in combination with tilt sensed by the gyroscope 47 shown in FIG. 1. The accelerometer can detect motion in all three spatial dimensions at once. As indicated by the arrows 60 in FIG. 5, a person can tilt the CE device 10 about the "Z" axis (coming out of the paper) to cause a movable object 61 such as a ball to traverse a virtual path 61a, within the constraints of the widget (e.g., the darker walls bordering the virtual path 61a). Accordingly, at block 62 of FIG. 6, the moving object application or widget can be initiated and at block 64 the direction of tilt is determined based on signals from the accelerometer 40. The speed at which the user tilts the CE device may also be determined. Then, at block 66 the object 61 is moved on the visual display in the direction(s) indicated by the tilt angle, and if desired the speed at which the object moves may be proportional to the speed with which the user tilts the CE device.

Figure 7:
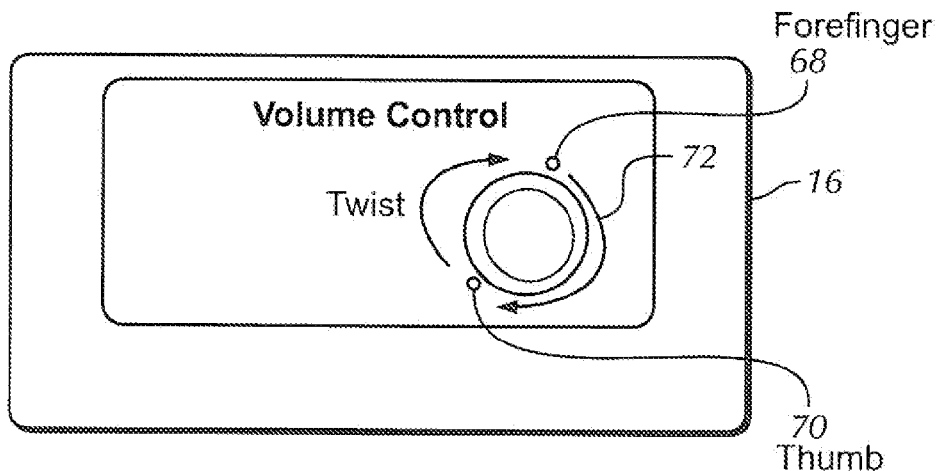
FIGS. 7 and 8 are screen shots of the CE device presenting a virtual rotatable knob for, e.g., audio control.
Figure 8:
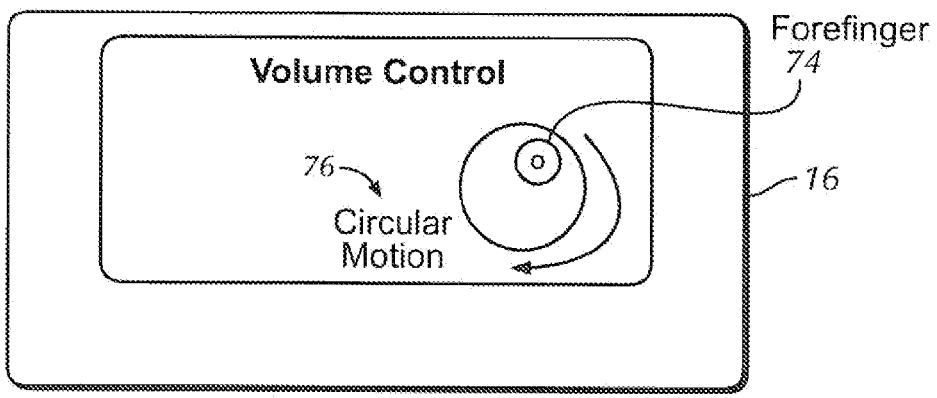
Figure 9:
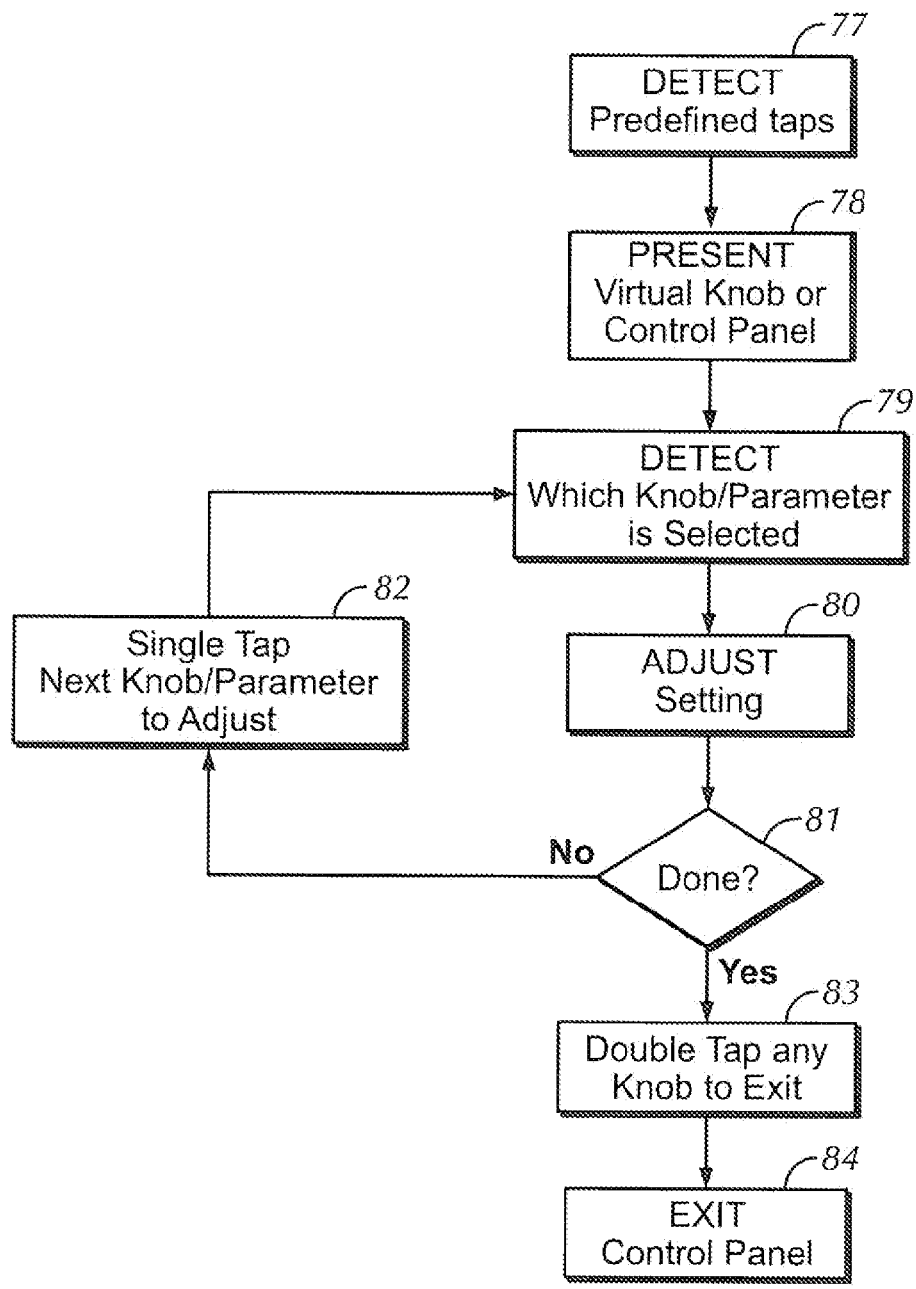
FIG. 9 is a flow chart of the logic for producing and using the screen shots of FIGS. 7 and 8.

FIGS. 7-9 illustrate how the tap detection module 28 may be executed to effect presentation of a virtual rotatable knob for generating a parameter-varying signal. With no virtual rotatable knob shown, a user may tap the housing 12 of the CE device 10 at any location. In one example the person taps the housing twice in succession, i.e., the person delivers two taps within a predetermined period, e.g., within two seconds of each other. The period may be programmable and may be changed as desired by the user. The tap is recognized by the processor 14 executing the tap module 28 from a spike in the signal from the accelerometer 40, and in response the rotatable knob shown in FIG. 7 or 8 is presented on the visual display 16. In another implementation the person taps the display using two fingers simultaneously, with the touchscreen detecting the multi-touch event and the accelerometer detecting the double tap.

As indicated at 68 and 70 in FIG. 7, a user may "rotate" the knob by placing forefinger and thumb, respectively, on the touchscreen display and executing an arcuate finger motion, indicated by the "twist" arrow 72. The processor 14 detects this arcuate motion by means of the capacitive elements in the touchscreen, and in response thereto outputs a parameter-varying signal. In one example the parameter-varying signal causes the volume being output by the audio display 18 to increase or decrease in response to clockwise and counter-clockwise motion, respectively, of the arcuate finger motion against the surface of the touchscreen display 16.

Alternatively, a single finger touch, indicated at 74 in FIG. 8, may be used to render the arcuate motion, indicated at 76 in FIG. 8, to generate the parameter-varying signal. Further still, the display may transition from the two-finger paradigm of FIG. 7 to the one-finger paradigm of FIG. 8 once the processor begins to sense arcuate finger motion. Parameters other than volume, e.g., volume, bass, and treble for audio or a virtual jog/shuttle wheel for a video display, may be adjusted using the above principles.

FIG. 9 illustrates the above logic. At block 77 the predetermined tap(s) are detected based on signals from the accelerometer 40 and/or by the visual display 16 when implemented as a touchscreen, and in response at block 78 the virtual knob or knobs are presented on the touchscreen 16. Then, at block 79 the selected knob (when multiple knobs are presented) and knob parameter selections as indicated by user arcuate touches are received and correlated to adjusted parameter settings at block 80.

Note that for coarse adjustments, the user can begin with the two-finger twist (FIG. 7) and then for finer granularity adjustment lift the thumb off the touchscreen and move the forefinger in an arcuate motion (FIG. 8) in one continuous sequence. Also the faster the circular motion, the faster the parameter may be changed. Alternatively, a slower circular movement can be interpreted by the processor 14 as a fine adjustment. Note that at the transition point of lifting the thumb to start the circular motion the appearance of the knob can change (from FIG. 7 to FIG. 8) to that of a dial such that the finger can easily track the circular motion of the dial.

In any case, as intimated above more than a single virtual knob can be presented on the display 16 at the same time, to in effect establish a "control panel" of knobs each of which can be manipulated in accordance with principles above to change a respective parameter. When this is the case, if the user is finished with adjusting one knob but not others at decision diamond 81 the user can tap the first knob at block 82, which is detected by the accelerometer and/or touchscreen to signal the processor that no further changes are intended using that knob, and then another knob may then be tapped to command the processor that the new knob is about to be used to change its respective parameter at block 79. In contrast, if the user is done a double tap on any knob at block 83 can cause the processor to remove that knob from display, or to remove all the knobs (the entire control panel) from display at block 84.

Figure 10:
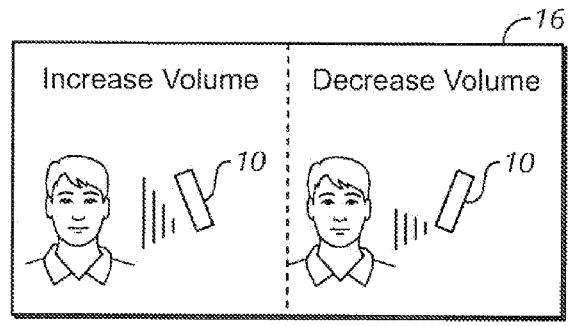
FIG. 10 is a schematic diagram showing tilting of the CE device to control volume.
Figure 11:
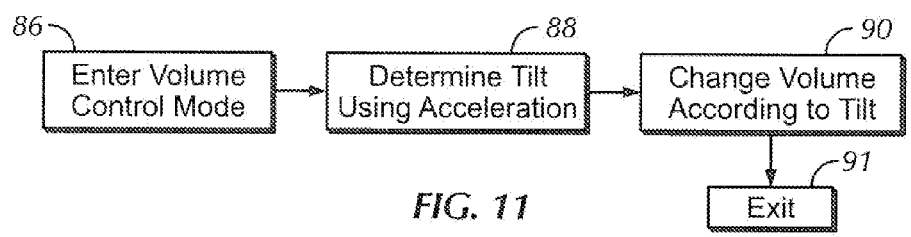
FIG. 11 is a flow chart of the logic used to effect the volume control depicted in FIG. 10.

FIGS. 10 and 11 show that the processor 14 can determine tilting of the CE device 10 based on signals from the accelerometer 40 and control volume of the audio display 18 accordingly. At block 86 of FIG. 11, the volume control mode may be entered to invoke the volume control module 32 to determine tilt at block 88. At block 90, the volume of the audio display 18 can be changed accordingly. For example, tilting the CE device 10 toward the user or in another predetermined direction (FIG. 10, left side) can cause the processor to increase the volume, whereas tilting the CE device 10 in the opposite direction (right panel of FIG. 10) can cause volume to be decreased. Such a tilt-based volume control advantageously is analog in nature so that the user can control how rapidly the volume changes by how steep the tilt is.

Not only can the speed of volume change be proportional to the steepness of the tilt, but in some embodiments the volume when tilt is reversed back toward a nominal orientation (e.g., with the bottom of the CE device 10 parallel to the earth's surface) is "locked in", so that the volume will not change back to where it was when the user places the CE device back down on a surface. Instead, to effect a volume change back the CE device 10 must be tilted past a nominal orientation to the opposite tilt direction. Accordingly, volume control mode is exited at state 91 once the signals from the accelerometer indicate that the user is orienting the housing back to its nominal orientation.

Figure 12:
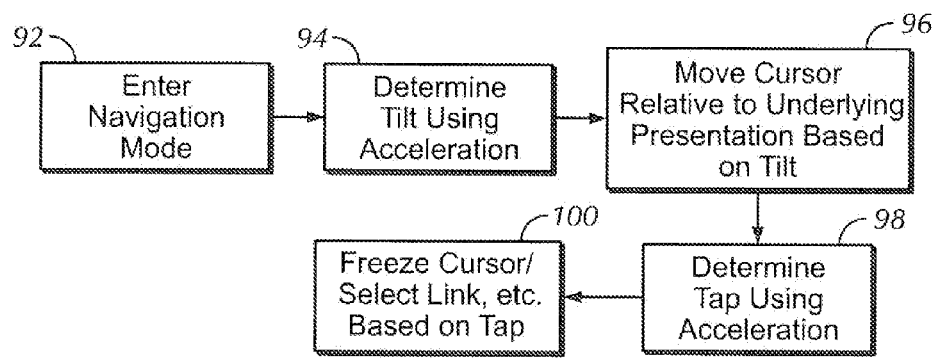
FIG. 12 is a flow chart of logic for using tilting of the CE device to navigate a screen cursor.

FIG. 12 shows that navigation of a cursor on the visual display 16 may be effective without a mouse using tilt as sensed by the accelerometer and determined by the processor 14. Commencing at block 92, the navigation module 34 is entered and tilt determined at block 94 using the output of the accelerometer 40. At block 96, the screen cursor is moved relative to the underlying presentation based on the tilt, with motion direction being dictated by tilt direction and motion speed dictated by amount of tilt, i.e., the speed of the navigation is proportional to the steepness of the angle relative to the z-axis.

Present principles envision that the cursor moves and the underlying application/document is fixed in the viewing area, or alternatively that the cursor is fixed and the underlying application/document moves relative to the fixed location. In the first case, the roaming cursor takes advantage of the accelerometer's motion detection in all three dimensions. The user tilts the CE device to navigate the cursor over, e.g., an item to be selected. When the cursor is fixed onscreen, it may be centrally located in the middle of the viewing area. The user tilts the device to move the application/document to align the item of interest under the cursor.

At block 98, once the cursor is positioned as desired with respect to the underlying presentation, the above-described tap property essentially establishes virtual select "buttons". For example, at block 100 directional and sequential tap patterns can be assigned to functions such as freeze, select, zoom-in/out, etc. For navigation purposes, both the tap and tilt properties thus are applied for "cursor" functions. Because the tap property of the accelerometer does not limit the device 10 to have virtual "buttons" defined on the display 16, a "tap" anywhere on the housing 12 can serve to establish a "select" command which is interpreted as such by the processor 14.

Figure 13:
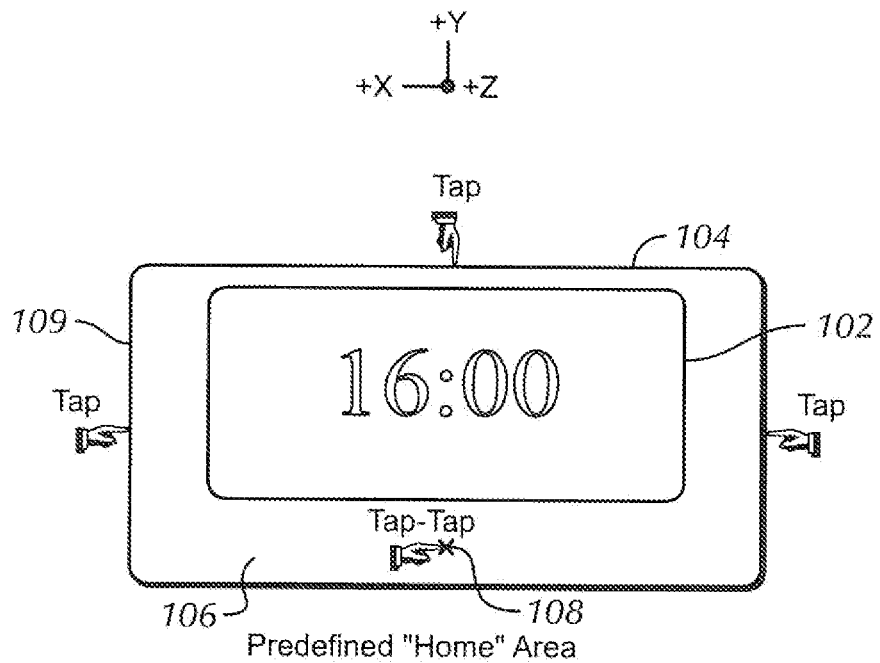
FIG. 13 is a screen shot illustrating use of two accelerometer-sensed taps to cause the device to change from a current screen to a home screen, with the device in a first orientation.
Figure 14:
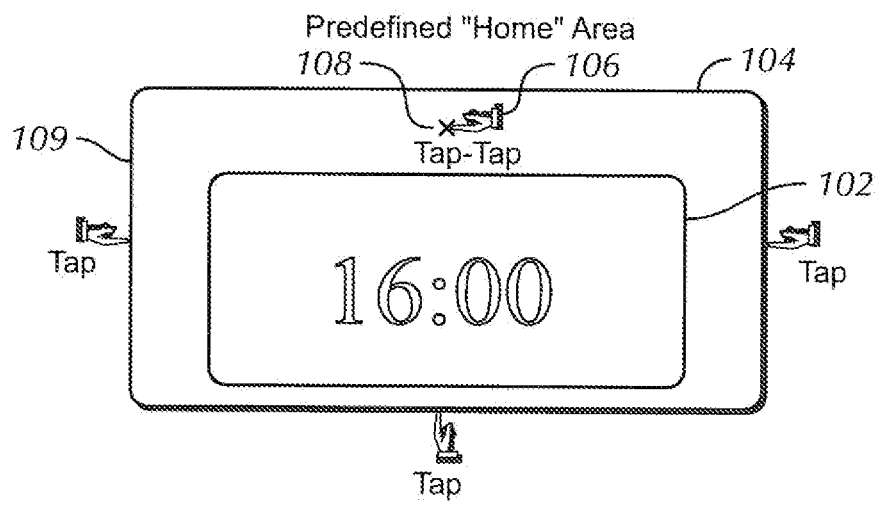
FIG. 14 is a screen shot illustrating use of two accelerometer-sensed taps to cause the device to change from a current screen to a home screen, with the device in a second orientation, with the first and second orientations differing by 180°.

As discussed above, the CE device may "flip" its display to always be "right side up" if the user rotates the device from one orientation to another. FIGS. 13 and 14 illustrate that in such an embodiment, a presentation 102 may be made on a CE device 104 which is made in accordance with present principles discussed above. A person can double tap (106) a predetermined location 108 on the device, in some embodiments indicated by a company logo, to cause the current presentation 102 to be removed from display and a predetermined "home page" presentation to be displayed. In this way, no distracting "home" button need be presented on the touchscreen display. In one implementation, while a logo may be used to indicate a location, a double tap anywhere on the non-touchscreen border 109 may generate the "home" signal.

If desired, the double tap may be interpreted by the processor to generate the "home" signal only when the double tap is sensed on the non-touchscreen border 109 in a predetermined one of the three spatial dimensions, e.g., when it is sensed in Z-dimension but not when a double tap is sensed in the X- or Y-dimensions. Alternatively, a double tap in any two or indeed in any of the three dimensions may be interpreted to generate the "home" signal as indicated by the hand icons in FIGS. 13 and 14 in the other dimensions.

Thus, the "present home screen" signal can be triggered only by the accelerometer and not the touch screen. In other words, in the event that a double tap is sensed by both the touchscreen and the accelerometer, the processor can, be programmed to accept only the touchscreen signal as input and interpret it accordingly, in this case by not interpreting it as a "home" screen signal. In contrast, in the event that a double tap is sensed by only the accelerometer, the processor can be programmed to interpret the presence of the signal from the accelerometer coupled with the absence of a simultaneous tap signal from the touchscreen as a "home" screen signal. More broadly, the processor may be programmed to interpret touch signals to mean one thing, actuating a control response, when both the accelerometer and the touchscreen produce identical touch sense outputs simultaneously, and to interpret the same touch signals to mean another thing, actuating a different control response, when only the accelerometer and not the touchscreen produces a touch sense output.

The home signal can be triggered by a single tap, double tap or triple tap on the home area 108, e.g., anywhere in the non-touchscreen border 109. If desired, a user may be allowed to define the location on the housing of the device that will serve as the home area 108.

With the above in mind, it may now be appreciated that present principles provide a CE device with an intuitive user interface in which fundamentally natural human gestures can be correlated to intuitive input signals.

While the particular ACCELEROMETER-BASED TOUCHSCREEN USER INTERFACE is herein shown and described in detail, it is to be understood that the subject matter which is encompassed by the present invention is limited only by the claims.

What is claimed is:

1. Consumer electronics (CE) device comprising:
   housing bearing a processor, a visual display, and an audio display, the processor controlling the displays;
   accelerometer in the housing and outputting first, second, and third signals to the processor representing acceleration of the housing in first, second, and third spatial dimensions, respectively;
   the processor determining a tilt of housing based on signals from the accelerometer and in response thereto controlling a volume output by the audio display, and/or controlling a position of a screen cursor relative to underlying presentation on the visual display, and/or controlling motion of a virtual object presented on the visual display, the processor responsive to a determination that the third signal is smaller than the first and second signals selecting the first and signals and not selecting the third signal, the processor combining the first and second signals to determine the direction and magnitude of tilt,
   wherein the processor determines a tilt of the housing used on signals from the accelerometer and in response thereto controls a position of a screen cursor relative to underlying presentation on the visual display.

2. The CE device of claim 1, wherein the processor determines a tilt of the housing based on signals from the accelerometer and in response thereto controls a volume output by the audio display.

3. The CE device of claim 2, wherein the volume is changed proportionate to a degree of tilt determined by the processor.

4. The CE device of claim 1, wherein the cursor is moved on the visual display in a direction indicated by the tilt.

5. The CE device of claim 1, wherein the cursor remains fixe l in a location of the visual display and the underlying presentation is moved on the visual display in response to the tilt.

6. The CE device of claim 1, wherein speed of motion of the cursor relative to the underlying presentation on the visual display is proportional to a degree of tilt determined by the processor.

7. Consumer electronics (CE) device comprising:
   housing bearing a processor, a visual display, and an audio display the processor controlling the displays;
   accelerometer in the housing and outputting first, second, and third signals to the processor representing acceleration of the housing, in first, second, and third spatial dimensions, respectively;
   the processor determining a tilt of the housing based on signals from the accelerometer and in response thereto controlling a volume output by the audio display, and/or controlling a position of a screen cursor relative to underlying presentation on the visual display, and/or controlling motion of a virtual object presented on the visual display, the processor responsive to a determination that the third signal is smaller than the first and second signals selecting the first and second signals and not selecting the third signal, the processor combining the first and second signals to determine the direction and magnitude of tilt,
   wherein the processor determines a tilt of the housing based on signals from the accelerometer and in response thereto controls motion of a virtual object presented on the visual display.

8. The CE device of claim 7, wherein speed of motion of the Object on the visual display is proportional to a degree of tilt determined by the processor.

* * * * *